United States Patent [19]

Hermann et al.

[11] 4,038,797

[45] Aug. 2, 1977

[54] EVACUATED THERMAL INSULATING GLAZING UNIT WITH AN INFRARED REFLECTING COATING

[75] Inventors: Wilhelm Hermann; Horst Horster, both of Roetgen, Germany

[73] Assignee: U.S. Philips Corporation, New York, N.Y.

[21] Appl. No.: 683,549

[22] Filed: May 5, 1976

[30] Foreign Application Priority Data

May 17, 1975 Germany .................. 2522159

[51] Int. Cl.² .................... E04B 5/45; E04B 2/28
[52] U.S. Cl. ........................ 52/306; 52/308; 52/616; 52/585
[58] Field of Search ............ 52/306, 307, 308, 616, 52/615, 586; 350/1, 96 R, 96 T

[56] References Cited

U.S. PATENT DOCUMENTS

| 1,729,818 | 10/1929 | Burgess | 52/308 |
| 1,960,160 | 5/1934 | Lousa | 52/308 |
| 1,994,387 | 3/1935 | Despret | 52/306 |
| 2,975,853 | 3/1961 | Friend | 52/306 |
| 3,425,163 | 2/1969 | Horgan, Jr. | 52/616 |
| 3,779,487 | 12/1973 | Ashton et al. | 29/455 R |
| 3,940,896 | 3/1976 | Steel | 52/307 |

FOREIGN PATENT DOCUMENTS

| 1,184,817 | 7/1959 | France | 52/307 |
| 1,239,689 | 7/1960 | France | 52/306 |

*Primary Examiner*—Price C. Faw, Jr.
*Assistant Examiner*—Robert C. Farber
*Attorney, Agent, or Firm*—Frank R. Trifari; David R. Treacy

[57] ABSTRACT

A thermal insulating glazing unit comprising a plurality of elongated evacuated sealed glass tubes arranged adjacent each other with their axes parallel, transverse to the light. The inner side of each of the glass tubes is covered by an infrared-reflecting coating.

7 Claims, 2 Drawing Figures

EVACUATED THERMAL INSULATING GLAZING UNIT WITH AN INFRARED REFLECTING COATING

The invention relates to a thermal insulating glazing unit provided with a light-transmitting infrared reflecting coating.

For various applications, for example, high-rise construction, photo-thermal conversion of solar energy in collectors, and reduction of intense heat radiation by heat shields, a high-quality thermal insulating, transparent glazing unit, is required.

A glazing unit of this kind should, for example, when used in high-rise construction and in solar collectors, transmit the sunlight as well as possible, but should substantially preclude the transmission of heat from the inside to the outside.

A glazing unit of this kind is expected to provide transmission values of visible light in excess of 50% and an extremely low coefficient of heat transmission $k \leqq 0.7$ W/m$^2$ ° K in practice. Ideal would be a coefficient of heat transmission comparable to that of a suitable thermally insulated wall where $k = 0.6$ W/m$^2$ ° K.

Low coefficients of heat transmission can be obtained by means of a multi-pane insulating glazing unit, transparent foils being arranged in the intermediate space therein (Austrian Patent Spec. No. 243,488). In the arrangement a coefficient of heat transmission of approximately 0.7 is achieved only when more than six foils are used. The complete window, however, then has a light transmittance of less than 50%.

Furthermore, German Auslegeschrift No. 1,509,721 and corresponding British Pat. No. 1,143,256 disclose a multi-pane insulation glazing unit consisting of at least two parallel glass panes which enclose an intermediate space which is filled with a gas having a heat conductivity lower than that of air, for example, krypton, at least one of the glass panes being provided on its inner side with a light transmitting infrared-reflecting coating, for example, of tin dioxide or indium oxide.

In a two-pane insulating glazing unit filled with krypton, a coefficient of heat transmission of 1.0 W/m$^2$ ° K is the theoretically achievable limit value. This limit value is determined by the optical properties of the infrared-reflecting coatings or and the heat conductivity and convection properties of the gas in the intermediate space. A reduction of the intermediate space between the two panes results in a reduction of the convection, but at the same time the heat conductivity of the gas is increased. Consequently, in the end a lower coefficient of heat transmission cannot be reached.

A further improvement could be achieved by eliminating the heat conduction and convection of the gas by evacuation of the intermediate space between the two panes. For normal pane dimensions with surface areas in excess of 1 m$^2$, this results in a surface load of approximately 10 tons/m$^2$. Such a strong construction cannot be realized, not even if the two panes are mechanically supported relative to each other.

The invention has for its object to provide a thermal insulating glazing unit which has a low coefficient of heat transmission and a high light transmittance and which has a simple and stable mechanical construction.

In accordance with the invention the thermal insulating glazing unit consists of a number of sealed and evacuated glass tubes which are adjacently arranged in contact with each other and which are covered on their inner sides by an infrared-reflecting coating.

Suitable infrared-reflecting coatings are made of silver, gold or tin dioxide, but are preferably made of indium oxide.

The evacuated glass tubes can be freely arranged one adjacent the other. Preferably, however, they are bonded together along longitudinal areas, for example by gluing or fusion.

Because the glass tubes are evacuated, i.e. they do not contain a filling gas, the coefficient of heat transmission of such a glazing unit is exclusively determined by the low radiation losses inside the glass tube provided with infrared-reflecting coatings, in addition to the heat conduction losses through the glass walls and the heat conduction and convection losses of air present between the individual glass tubes.

In a preferred embodiment of the glazing unit in accordance with the invention, the glass tubes are arranged between the glass panes of a two-pane thermal insulating system. The space between the two glass panes can be filled either with dry air or a gas having a lower heat conductivity than air. A glazing unit having a coefficient of heat transmission of less than 0.7 W/M$^2$ ° K can be obtained when the described glass tubes are arranged in this manner.

The glass tubes can either contact the glass panes directly or be arranged at a distance of from 5 to 50 mm, preferably of from 5 to 25 mm, from the glass panes.

The invention will be described in detail hereinafter with reference to the drawing.

Figure 1:
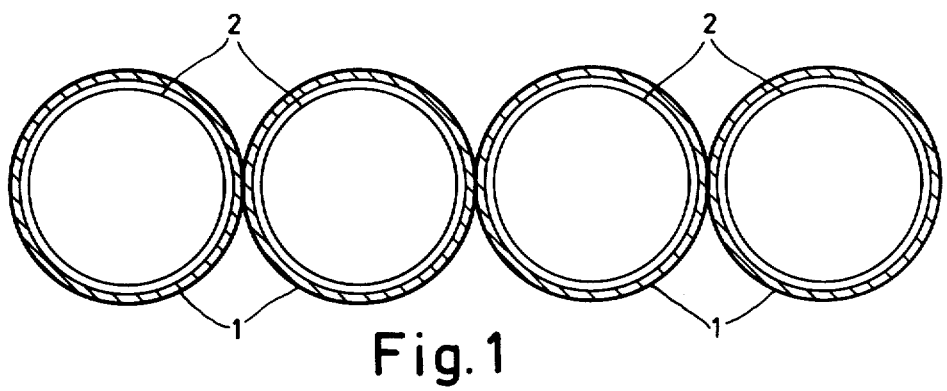
FIG. 1 is a sectional view of a thermal insulating glazing unit in accordance with the invention.

The thermal insulating glazing unit shown in FIG. 1 consists of a plurality of evacuated sealed glass tubes 1 which are adjacently arranged in a layer in contact with each other with their respective longitudinal axes parallel and co-planar. The glass tubes 1 are coated on the inside by an infrared-reflecting coating 2, for example, made of In$_2$O$_3$. The glass tubes 1 can be freely juxtaposed or can be bonded to each other by gluing or fusion etc.

Figure 2:
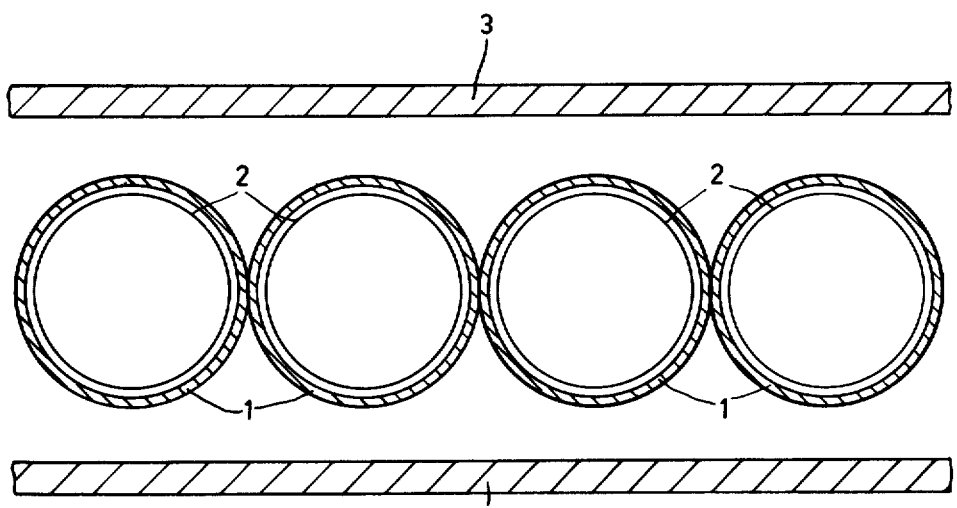
FIG. 2 is a sectional view of a thermal insulating glazing unit in accordance with the invention arranged between the two panes of a thermal insulating system.

Referring to FIG. 2, the adjacently arranged elongated evacuated glass tubes 1, provided with an infra-red-reflecting coating 2, are arranged with their longitudinal axes co-planar and parallel to and between the glass panes 3 of a thermal insulating system. In this case a clearance is maintained between the glass tubes 1 and the glass panes 3.

In a practical embodiment, the diameter of the glass tubes 1 amounted to 60 mm, their wall thickness to 1 mm and their length to 100 cm. The infrared-reflecting coating was made of indium oxide and had a thickness of 0.4 microns. The thickness of the glass panes 3 amounted to 4 mm. The distance between the glass tubes 1 and the glass panes 3 amounted to 12 mm. The coefficient of heat transmission factor $k$ of this arrangement was less than 0.7 W/m$^2$ ° K.

A high-quality thermal insulating glazing unit of this kind can be used in particular as a structural component in walls or roofs of buildings when good thermal insulation is required.

What is claimed is:

1. A thermal insulating glazing unit comprising a plurality of sealed and evacuated glass tubes having respective longitudinal axes, the tubes being covered on their respective inner sides by a light-transmitting infrared-reflecting coating and arranged in a layer in contact with each other with their longitudinal axes parallel, whereby light may be transmitted through the unit transverse to the longitudinal axes of the tubes while infrared energy is reflected.

2. A unit as claimed in claim 1 wherein adjacent tubes are bonded to each other.

3. A unit as claimed in claim 2 wherein said layer of tubes is arranged with longitudinal axes of the layer being co-planar.

4. A thermal insulating glazing unit comprising two glass panes spaced apart parallel to each other, and a plurality of elongated sealed and evacuated glass tubes having respective longitudinal axes, the tubes being arranged in a layer between said glass panes with respective longitudinal axes of the tubes parallel to said panes and to each other, said tubes being adjacent each other and covered on their respective inner sides by a light-transmitting infrared-reflecting coating.

5. A unit as claimed in claim 4 wherein at least some of said tubes are arranged in a co-planar layer parallel to the panes, adjacent tubes being bonded to each other.

6. A glazing unit as claimed in claim 5 wherein said tubes are disposed at a distance of between 5mm and 50mm from said panes.

7. A unit as claimed in claim 6 wherein said tubes are arranged at a distance of between 10mm and 15mm from said panes.

* * * * *